United States Patent [19]
Bockley et al.

[11] Patent Number: 5,660,462
[45] Date of Patent: Aug. 26, 1997

[54] HIGH EFFICIENCY VEHICLE HEADLIGHTS AND REFLECTOR LAMPS

[75] Inventors: Erich J. Bockley, N. Reading, Mass.; Peter R. Gagnon, Lexington, Ky.

[73] Assignee: Osram Sylvania Inc., Danvers, Mass.

[21] Appl. No.: 304,903

[22] Filed: Sep. 13, 1994

[51] Int. Cl.[6] .................................................. F21M 3/16
[52] U.S. Cl. ........................ 362/256; 362/293; 362/303; 313/113; 313/318.11
[58] Field of Search .................................. 362/255, 256, 362/267, 293, 303, 302, 298, 346; 313/113, 112, 114, 318.11

[56] References Cited

U.S. PATENT DOCUMENTS

| | | | |
|---|---|---|---|
| 1,525,369 | 2/1925 | Campbell | 362/256 |
| 1,578,079 | 3/1926 | Davis | 362/256 |
| 1,627,688 | 5/1927 | Claflin | 362/303 |
| 1,659,764 | 2/1928 | Bridgham | 362/303 |
| 1,671,900 | 5/1928 | Irwin | 362/296 |
| 1,974,982 | 9/1934 | Christmas | 362/298 |
| 3,445,662 | 5/1969 | Langley | 250/504 R |
| 3,463,914 | 8/1969 | Lutter | 362/303 |
| 3,511,983 | 5/1970 | Dorman | 362/217 |
| 3,983,513 | 9/1976 | DeCaro | 313/113 |
| 4,039,878 | 8/1977 | Eijkelenboom et al. | 313/113 |
| 4,288,713 | 9/1981 | Marlor | 313/117 |
| 4,375,605 | 3/1983 | Fontana et al. | 313/113 |
| 4,391,847 | 7/1983 | Brown | 427/106 |
| 4,725,934 | 2/1988 | Gordin | 362/256 |
| 4,758,761 | 7/1988 | Ingeveld et al. | 313/113 |
| 4,864,181 | 9/1989 | Huijbers et al. | 313/113 |
| 4,942,331 | 7/1990 | Bergman et al. | 313/271 |
| 5,220,237 | 6/1993 | Maseki et al. | 313/113 |

FOREIGN PATENT DOCUMENTS 0437736 4/1912 France ............................. 362/256

*Primary Examiner*—Alan Cariaso
*Attorney, Agent, or Firm*—Carlo S. Bessone

[57] ABSTRACT

An incandescent lamp assembly, such as an automobile headlight, includes a reflector defining a cavity having a reflecting surface, and an incandescent lamp capsule mounted within the reflector. The incandescent lamp capsule, typically a tungsten halogen incandescent lamp capsule, includes a light-transmissive envelope, a filament sealed in the envelope and a fill material including an inert gas and a halogen additive. A specularly reflective coating is formed on a portion of the envelope for reflecting visible light and infrared radiation emitted by the filament and not directed to the reflecting surface of the reflector. The envelope is ellipsoidally shaped, at least in the portion having the reflective coating, so that the reflective coating reflects visible light and infrared radiation emitted by the filament back to the filament. The reflective coating limits glare and increases the operating efficiency of the headlight.

28 Claims, 3 Drawing Sheets

HIGH EFFICIENCY VEHICLE HEADLIGHTS AND REFLECTOR LAMPS

FIELD OF THE INVENTION

This invention relates to vehicle headlights and reflector lamps and, more particularly, to vehicle headlights and reflector lamps wherein a reflective coating on the envelope of the lamp capsule is used to control the light output.

BACKGROUND OF THE INVENTION

A typical halogen lamp headlight system includes a reflector and a lamp capsule placed with its filament at or near the focal point of the reflector. The reflector commonly includes a parabolic or ellipsoidal rear portion and flat wall sections between the rear portion and the front of the assembly. The front is usually covered with a transparent lens. Typically, the lens, the reflector, or a combination of both is designed to direct the light from the light source into a specified pattern.

It is critical, particularly in low beam applications, to control the light output of the headlight so that stray light, or glare, does not shine in the eyes of the drivers of oncoming cars. In order to control the light output of the headlight, it is necessary to control the light which is emitted from the lamp capsule so that reflections from non-parabolic or non-ellipsoidal portions of the reflector are minimized. Low beam headlights are typically designed such that light which is emitted at 10° to 90° up from the axis of the lamp capsule is blocked from exiting the headlight, because this light forms what is known as veiling glare. Light from the lamp capsule is also prevented from impinging on the lens directly, because this also contributes to veiling glare. In general, for low beam headlights, efforts are taken to ensure that the light which is emitted from the lamp capsule, but which is not directed toward the parabolic or ellipsoidal portion of the reflector, is prevented from striking the reflector surface or from exiting the headlight system. The light which is reflected from the parabolic or ellipsoidal portion of the reflector is more controlled and is less likely to cause glare in the headlight system.

Several prior art methods have been used to control the light emitted from lamp capsules in vehicle headlight systems. One common method is to cover the portion of the lamp capsule which faces the lens with an opaque, low reflectivity material that prevents transmission of light from this portion of the lamp capsule. A headlight wherein the central portion of the lamp capsule is coated with a film of mercury to render it opaque is disclosed in U.S. Pat. No. 1,671,900 issued May 29, 1928 to Irwin. An incandescent lamp having a top portion of the lamp coated with a non-reflective, opaque coating of manganese dioxide and aluminum phosphate is disclosed in U.S. Pat. No. 4,288,713 issued Sep. 8, 1981 to Marlor. A halogen lamp having an opaque coating of sodium silicate and manganese dioxide for masking portions of the light output is disclosed in U.S. Pat. No. 4,391,847 issued Jul. 5, 1983 to Brown.

Another method of controlling light in headlight systems involves placing a light shield inside the headlight reflector. The light shield is commonly a non-reflective black metal which can withstand the high temperature generated by the lamp capsule. The light shield effectively blocks the unwanted light emitted by the lamp capsule. Still another method involves mounting a refractory metal shield inside the lamp capsule near the filament. These methods of controlling the light emitted by the lamp capsule result in inefficiencies in the headlight system, because they prevent a large percentage of the light emitted by the lamp capsule from exiting from the headlight system.

Automobile headlights wherein a portion of the lamp capsule has a reflective coating are disclosed in the prior art. U.S. Pat. No. 1,974,982, issued Sep. 25, 1934 to Christmas, discloses an automobile headlight wherein a portion of the lamp is silver plated to control the light output from the headlight system. The Christmas patent states that light reflected by the silvered area to the reflective panels is fanned out because this reflected light comes from beyond the focus of the reflective panels. An automobile headlight wherein a portion of the lamp is rendered opaque by silvering is disclosed in U.S. Pat. No. 1,578,079 issued Mar. 23, 1926 to Davis. The silvered portion reflects light emitted by the filament onto the main reflector. A disadvantage of this configuration is that light rays reflected by the reflective coating onto the main reflector may potentially cause glare, because they do not originate at the focal point of the main reflector and, thus, are outside the desired light pattern.

Tungsten halogen lamps having specular reflective coatings which function as reflectors for directing light in a desired direction are disclosed in U.S. Pat. No. 3,983,513 issued Sep. 28, 1976 to DeCaro. An infrared heater wherein a filament is mounted in a reflector having an infrared reflective coating is disclosed in U.S. Pat. No. 3,445,662 issued May 20, 1969 to Langley. U.S. Pat. No. 4,864,181, issued Sep. 5, 1989 to Huijbers et al, discloses an incandescent lamp having a truncated conical filament with a zigzag configuration and a mirror coating with a central opening on the lamp envelope. The disclosed lamp, when mounted in a parabolic reflector, is used as a traffic signal lamp. U.S. Pat. No. 4,758,761, issued Jul. 19, 1988 to Ingeveld et al, discloses an electric lamp wherein a portion of the lamp envelope is coated with an aluminum layer, and a boundary of the aluminum layer has a transparent aluminum oxide layer.

Interference filters have been used with tungsten halogen lamps to increase efficiency. The interference filter is formed as a multi-layer coating on the outer surface of a spherical or elliptical lamp envelope. The interference filter passes visible light and reflects infrared radiation back to the filament, causing an increase in filament temperature and operating efficiency. An example of a tungsten halogen lamp having an infrared reflective coating is disclosed in U.S. Pat. No. 4,942,331, issued Jul. 17, 1990 to Bergman et al.

SUMMARY OF THE INVENTION

According to a first aspect of the invention, an incandescent lamp capsule comprises a hermetically sealed, light-transmissive envelope, a fill material including an inert fill gas contained within the envelope, at least one filament sealed in the envelope and supported by lead-in wires, and a specularly reflective coating on a portion of the envelope for which light emission is not desired. The envelope is shaped, at least in the portion having the reflective coating, so that the reflective coating reflects radiation (both IR and visible light) emitted by the filament back to the filament. Some of the reflected light is absorbed by the filament, some passes through the filament, and some is reflected by the filament in a desired direction. The lamp capsule is typically a tungsten halogen incandescent lamp. In this case, the fill gas includes a halogen additive.

The envelope, at least in the portion having the reflective coating, preferably has an ellipsoidal shape, and the filament is located on or near the axis of the ellipsoidally-shaped envelope. The reflective coating is preferably formed on an outside surface of the envelope and may be selected from the group consisting of aluminum, silver, copper, chromium, nickel, gold, rhodium, palladium, platinum, and combinations thereof.

According to another aspect of the invention, a thin film of a metal oxide, such as silicon dioxide, is formed on the inside surface of the envelope. The coating forms a barrier on the inner surface of the envelope and prevents components of the envelope from reaching the interior of the envelope and reacting with the halogen additive in the lamp interior. The metal oxide barrier limits blackening of the lamp envelope.

According to another aspect of the invention, an incandescent lamp assembly comprises a reflector defining a cavity, the cavity having a shaped, light-directing surface, and an incandescent lamp capsule mounted within the reflector. The shaped, light-directing surface is typically a parabolic or ellipsoidal reflecting surface. The incandescent lamp capsule comprises a hermetically sealed, light-transmissive envelope, a fill material including an inert gas contained within the envelope, at least one filament sealed in the envelope and supported by lead-in wires, and a specularly reflective coating on a portion of the envelope for reflecting radiation emitted by the filament and not directed to the parabolic or ellipsoidal reflecting surface of the reflector. The envelope is shaped, at least in the portion having the reflective coating, such that the reflective coating reflects radiation emitted by the filament back to the filament. The envelope of the incandescent lamp capsule, at least in the portion having the reflective coating, preferably has an ellipsoidal shape. The filament is preferably located on or near the axis of the ellipsoidally-shaped envelope. The incandescent lamp capsule is mounted within the reflector such that the filament is located at or near the focal point of the parabolic or ellipsoidal reflecting surface.

The lamp assembly may further include a lens which closes the cavity of the reflector. The reflective coating on the lamp capsule envelope may be patterned to block direct transmission of light from the filament to the lens, or to the open end of the reflector when a lens is not used, and to portions of the reflector other than the parabolic or ellipsoidal reflecting surface. The reflective coating may also be patterned to block direct transmission of light from the filament to the heel portion of the reflector in which the incandescent lamp capsule is mounted.

The lamp assembly of the present invention is typically a vehicle headlight, and the reflective coating is used to limit glare. The reflective coating also increases the operating efficiency of the vehicle headlight. The lamp assembly can also be a conventional reflector lamp used for general illumination applications.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
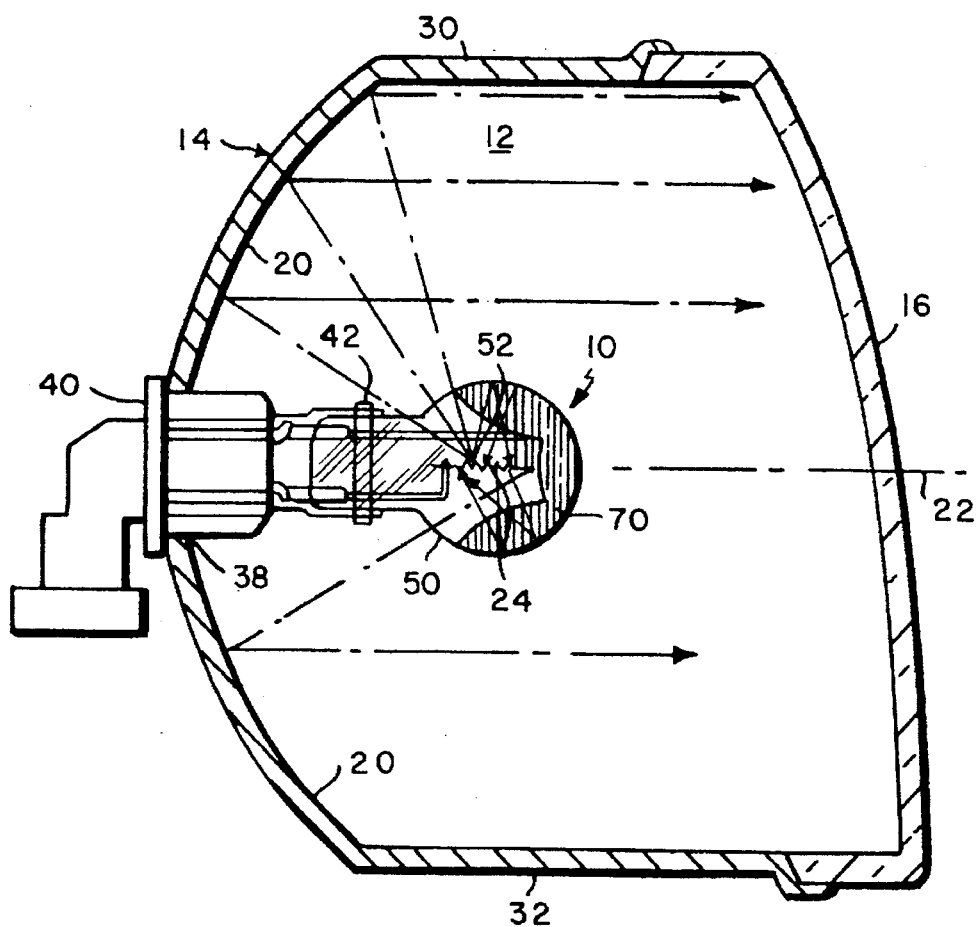
FIG. 1 is a cross-sectional side view of a vehicle headlight assembly in accordance with the present invention.
Figure 2:
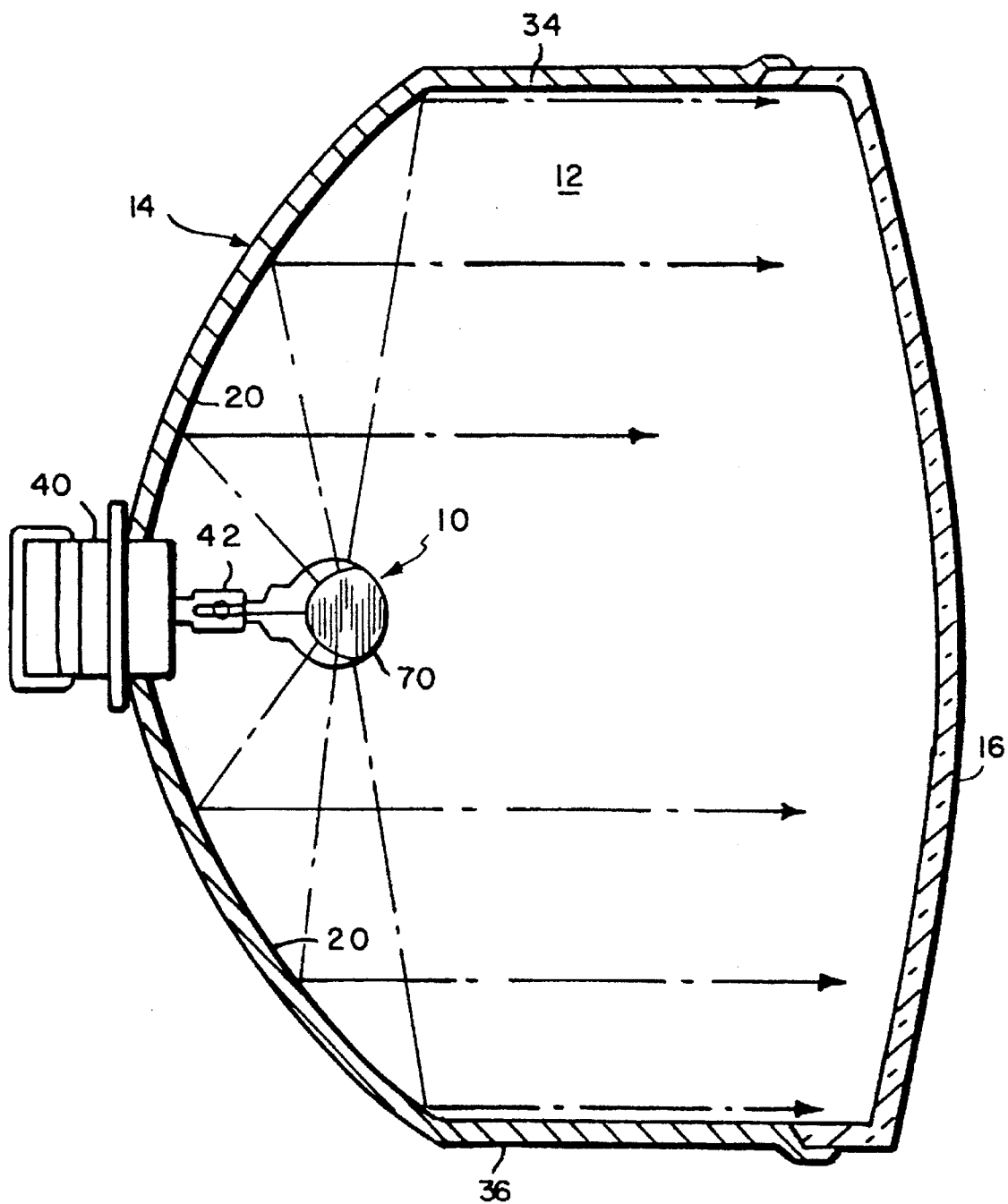
FIG. 2 is a cross-sectional top view of the vehicle headlight assembly of FIG. 1.

A vehicle headlight assembly in accordance with the present invention is shown in FIGS. 1 and 2. A lamp capsule 10 is mounted within a cavity 12 of a reflector 14. The cavity 12 is closed by a transparent lens 16, which may have light-directing elements. The reflector 14 has a shaped, light-directing interior surface 20 that is usually parabolic in shape, but may be ellipsoidal or may have other shapes. The parabolic reflecting surface 20 has a central axis 22 and a focal point 24. The reflector 14 also may include a top wall 30, a bottom wall 32, and side walls 34 and 36 which extend between light-directing surface 20 and lens 16. The walls 32, 34 and 36 may have any suitable shape and may have a reflective coating, but are typically not designed for reflecting light in a desired direction. The reflector further includes a heel portion 38 for mounting of the lamp capsule 10. Typically, the heel portion 38 is located on the axis 22 of reflecting surface 20.

The lamp capsule 10 can be mounted in reflector 14 by any suitable mounting structure as known in the art. In the example of FIGS. 1 and 2 the lamp capsule 10 is supported by a lamp base 40 and a mounting strap 42. The lamp base 40 is provided with electrical conductors for connecting the contact pins of the lamp capsule 10 to a source of electrical energy in conventional fashion.

Figures 3, 4:
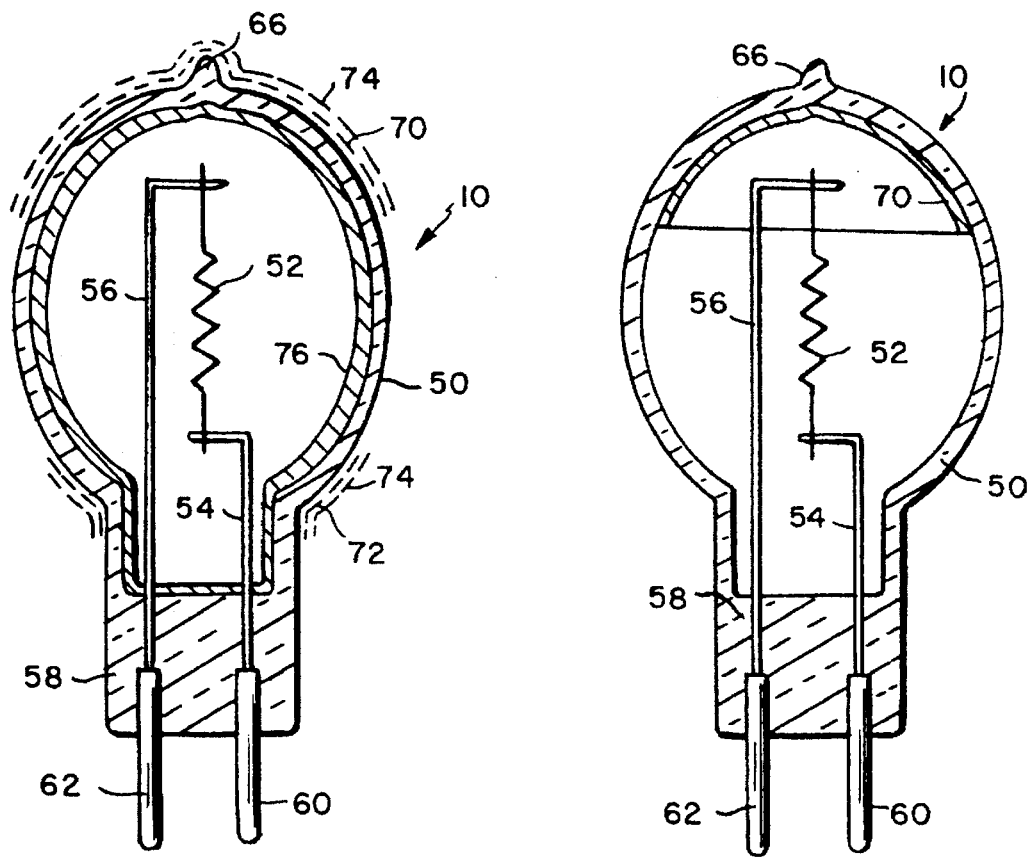
FIG. 3 is a cross-sectional view of the lamp capsule of FIG. 1, illustrating a reflective coating on the outer surface of the lamp envelope.
FIG. 4 is a cross-sectional view of the lamp capsule of FIG. 1, illustrating a reflective coating on the inside surface of the lamp envelope.

The lamp capsule 10 can be any incandescent lamp, but is typically a tungsten halogen incandescent lamp. As best shown in FIG. 3, the lamp capsule 10 includes a hermetically sealed, light-transmissive lamp envelope 50 and a filament 52 sealed within the envelope 50 and supported by lead-in wires 54 and 56. The lead-in wires 54 and 56 extend through a press seal 58 formed in envelope 50 and are electrically connected to external contact pins 60 and 62, respectively. The envelope 50 is preferably fabricated of a hardglass material such as borosilicate or aluminosilicate glass. Envelope 50 is provided with the usual tubulation 66 (shown tipped off in FIG. 3) through which air is exhausted and an inert gas and one or more halogens (i.e., iodine, bromine, chlorine and fluorine) is introduced. The tubulation can be located at the upper end of the lamp capsule as shown in FIG. 3, or can be located elsewhere, such as in the press seal, to maximize reflective area and to minimize distortion of the ellipsoidal shape, as described below. In a preferred embodiment of a 12 volt lamp capsule, the lamp fill comprises, by volume, 0.3% hydrogen bromide and a phosphine getter, with the balance being krypton. The total fill pressure is about 5 atmospheres absolute at room temperature. In a preferred embodiment of a 120 volt lamp, the lamp fill comprises, by volume, 0.17% hydrogen bromide and a phosphine getter, with the balance being 95% krypton and 5% nitrogen. The total fill pressure is about 5 atmospheres absolute at room temperature. It will be understood that the envelope and filament structure of the tungsten halogen incandescent lamp capsule 10 may have configurations other than that shown in FIGS. 1–3.

The lamp capsule 10 is preferably mounted in reflector 14 such that the longitudinal axis of filament 52 coincides with the central axis 22 of parabolic or ellipsoidal reflecting surface 20 and such that the center of filament 52 is located at or near the focal point 24 of parabolic or ellipsoidal reflecting surface 20 and at or near the central axis of envelope 50. This ensures that light emitted by filament 52 and incident on parabolic or ellipsoidal reflecting surface 20 is reflected through lens 16 as a light beam of approximately parallel light rays. (An ideal parallel beam is obtained only for a point source at the focal point of the reflecting surface.)

In accordance with the present invention, a specularly reflective coating 70 is formed on one or more portions of envelope 50. The reflective coating 70 blocks direct transmission of light from filament 52 to top wall 30, bottom wall 32 and side walls 34 and 36 of reflector 14 and to lens 16, thereby reducing stray reflections and glare. In addition, the reflective coating 70 is configured to reflect both visible light radiation and infrared (IR) radiation emitted by filament 52 back to filament 52. This is achieved by appropriate shaping of envelope 50. For a linear coil filament 52 as shown in FIGS. 1-3, the envelope 50 is formed with an ellipsoidal shape, at least in the portions covered by reflective coating 70, to ensure that as much as possible (i.e., substantially all) of the radiation emitted by filament 52 in the direction of reflective coating 70 is reflected by reflective coating 70 back to filament 52. Some of the reflected radiation is absorbed by filament 52, thereby increasing its temperature and its operating efficiency. The efficiency is increased by decreasing the input electrical energy required to reach a desired operating temperature. Reflected radiation not absorbed by filament 52 may be reflected by the filament to shaped, light-directing surface 20, or may pass between the coils of the filament to the shaped, light-directing surface 20. Light reflected by or passing through the filament will appear, from the perspective of the shaped, light-directing surface 20, to have emanated from the filament and will be directed by the optical system identically to light coming directly from the filament. In each case, the light is reflected by shaped, light-directing surface 20 in the desired direction, thereby increasing the useful output of the headlight assembly.

As noted above, the reflective coating 70 reflects infrared energy back to filament 52 where some of this energy is absorbed by the filament, thus further lowering the amount of energy which must be supplied to the lamp capsule 10 to maintain the operating temperature of the filament 52. This further increases the efficacy of the lamp capsule. Reflection of infrared energy from the coating 70 to the filament is believed to produce a major portion of the efficacy gain of the filament.

The lamp envelope 50 must be shaped such that the light rays reflected by the reflective coating 70 are directed back to the filament 52. As noted above an ellipsoidal shape meets this requirement for a linear coil filament and is preferred. In addition, the reflective coating 70 must reflect light and infrared energy in a specular manner, since diffuse reflection of light will not be concentrated on the filament and may thereby produce an unacceptable glare in the headlight and may reduce the efficacy gains in the lamp capsule.

Suitable specularly reflective materials include, but are not limited to, aluminum, silver, copper, chromium, nickel, gold, rhodium, palladium, platinum, and combinations thereof. The reflective coating may be used on the inside surface or the outside surface of the envelope 50, but is preferably applied to the outside surface, as illustrated in FIG. 3. While the reflective coating 70 may be applied to the inner surface of the lamp envelope as shown in FIG. 4, it is more difficult to apply the coating in a precise pattern on the inner surface of a small automotive headlight lamp capsule. The reflective material is typically used on the outer surface of a tungsten halogen lamp capsule, which is designed to be as small as possible to minimize the effects of the envelope in acting as a secondary source of light, and the lamp capsule may burn in air at temperatures which can be greater than 600° C. The selected reflective material must be able to withstand these operating conditions for the life of the lamp without melting, evaporating, subliming or oxidizing. Some materials which can survive these conditions without degradation in performance include gold, platinum, palladium and rhodium. Another approach is to coat the outer surface of the lamp envelope with an easily-oxidized reflective material, such as aluminum or silver, and to overcoat the reflective areas with a protective film 74 (FIG. 3), such as silicon dioxide, to prevent these materials from degrading when the lamp is operated in air. Alternatively, an easily-oxidized reflective material, such as silver or aluminum, may be used by mounting the lamp capsule in a reflector system which is hermetically sealed and which is filled with an inert atmosphere, such as nitrogen.

Figure 6:
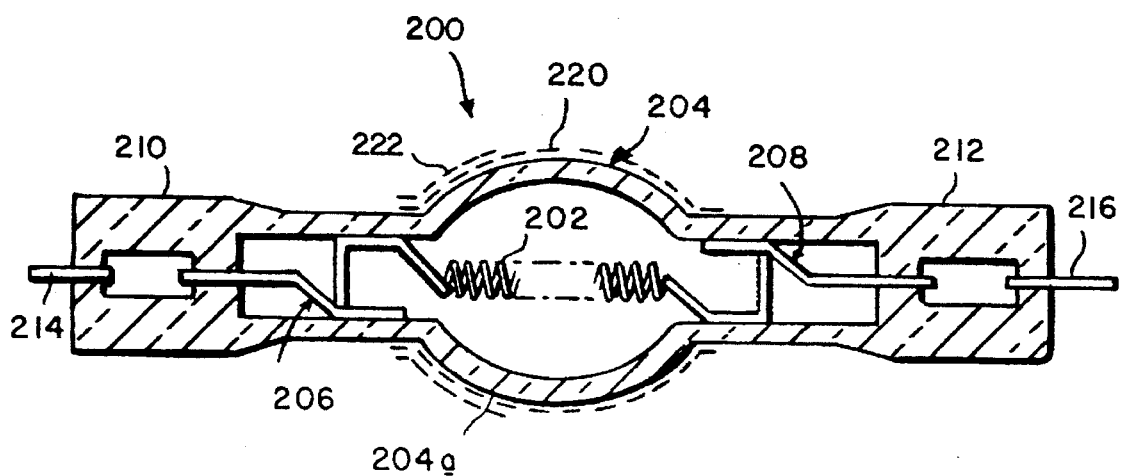
FIG. 6 is a cross-sectional view of a double-ended lamp capsule in accordance with the present invention.

The reflective coating of the present invention can be applied to single-ended lamp capsules, as shown in FIGS. 1-3, and to double-ended lamp capsules wherein the lamp leads extend from opposite ends of the lamp envelope, as shown in FIG. 6. The double-ended lamp capsule is mounted in a reflector as shown, for example, in U.S. Pat. No. 4,942,331. Preferably, however, the reflective coating is utilized on a single-ended lamp capsule, since this configuration has a greater elliptical surface area at one end of the capsule to which the reflective coating can be applied. Some reflectors have a relatively large heel portion where the lamp capsule is mounted, and light directed from the filament toward the heel portion is not reflected by parabolic or ellipsoidal reflecting surface 20. Thus, in some cases it may be beneficial to apply a reflective coating to the bottom portion of the envelope 50 to reflect back to the filament those light rays which would otherwise be projected into the heel portion of the reflector 14. A reflective coating 72 on the bottom portion of envelope 50 is shown in FIG. 3.

The areas of the lamp capsule 10 to be covered by the reflective coating 70 can be determined empirically or by the use of computer modeling or a CAD system. The specific areas having reflective coating 70 will be different for each type or shape of reflector in which the lamp capsule is mounted. In a headlight system, it is desirable that all of the light which leaves the headlight be reflected from the parabolic reflecting surface 20 of the reflector 14, because the light is more controllable when it is reflected from the parabolic surface. It is also desirable that the light be emitted from or near the focal point of the parabolic reflecting surface 20, since this light is directed in a controlled and predictable manner. Preferably, all of the portions of the lamp capsule which do not emit light directly onto the parabolic reflecting surface 20 are coated with the specularly reflective material as described above.

In the headlight assembly illustrated in FIGS. 1 and 2, parabolic reflecting surface 20 typically has relatively small vertical dimensions (see FIG. 1) and relatively large horizontal dimensions (see FIG. 2). For this reason reflective coating 70, which covers a portion of envelope 50 facing lens 16, is asymmetrical around axis 22 and covers a greater portion of the envelope 50 where the envelope 50 faces the top wall 30 and the bottom wall 32 of reflector 14 than where the envelope 50 faces side walls 34 and 36. In other configurations, the reflective coating 70 may have a different pattern. For example, where the reflector has circular symmetry about its central axis, the reflective coating can likewise have circular symmetry. In general, the pattern of the reflective coating is matched to the reflector in which it is mounted.

In a vehicle headlight assembly, the reflective coating is preferably formed on an area of the envelope between the filament and the lens and on an area of the envelope between the filament and portions of the reflector other than the parabolic or ellipsoidal reflecting surface. This requirement can be met over the entire length of the filament, over a portion of the length of the filament or by considering the filament as a point source located at the focal point of the parabolic or ellipsoidal reflecting surface of the reflector. When light is blocked by the reflective coating 70 over the entire length of the filament, the reflective coating 70 covers a greater portion of the surface area of envelope 50.

The reflector material can be applied to the surface of the envelope 50 using many different techniques, such as the application of a solution of the desired metal in a solvent by brushing, spraying, stamping, etc. followed by a firing to dry the solid. Other application methods include vacuum deposition techniques, such as sputtering and evaporation, wherein selected portions of the lamp envelope are masked. Good results have been obtained using a vacuum evaporation technique.

It is desirable to make the lamp capsule as small as is practical. One reason is that the accuracy with which light is reflected back to the filament by the reflective coating 70 on the lamp envelope decreases as the size of the lamp envelope increases. However, small lamp capsules of a given wattage operate at higher temperatures than large lamp capsules. It is known that at high wall temperatures in hardglass tungsten halogen lamps, some of the components of the hardglass diffuse to the inner surface of the glass and/or outgas into the lamp interior, where they interact with the halogen gas. The result is a condensation of the reacted halogen gas on the inner walls of the lamp envelope, which lowers the available halogen in the lamp to a level that is not sufficient to effectively transport all of the evaporated tungsten on the inner surface of the envelope back to the filament and causes the lamp to blacken. The problem of high wall temperatures becomes even more pronounced with the present invention, because the reflective coating on the surface of the lamp envelope effectively increases the wall temperature of the lamp capsule as compared to a similar lamp capsule without a reflective coating.

To overcome the blackening problem while allowing a small lamp capsule size, the present invention includes a feature which limits the rate at which halogen gas combines with the components of the hardglass at elevated temperatures. As shown in FIG. 3, a thin coating 76 of a metal oxide, preferably silicon dioxide, is applied to the inner walls of the hardglass lamp envelope. The coating 76 forms a barrier on the inner surface of the lamp envelope which prevents the components of the hardglass from reaching the interior of the lamp envelope. This prevents the halogens, such as iodine, bromine and chlorine, from reacting with the components of the hardglass, such as the alkali metals, at elevated temperatures. Thus, the halogen remains in a gaseous state where it can continue in the tungsten halogen regenerative cycle. The metal oxide coating 76 preferably has a thickness in the range of 100 angstroms to 3000 angstroms. The coating is not necessarily free from defects such as pinholes and does not necessarily cover the entire internal surface of the lamp envelope. Good results can be obtained if the coating covers a substantial portion of the internal surface of the lamp envelope which is subjected to temperatures which are known to be excessive for hardglass tungsten halogen lamps.

The internal barrier layer coating can be formed on the inside surface of the lamp envelope by many different techniques. In one approach, a solution is formed from a mixture of tetraethylorthosilicate, ethanol, distilled water and nitric acid. The relative amounts of the components may be varied to yield a coating with the desired properties. The solution is applied to a hardglass capsule before it is pressed into a lamp by dipping, by syringes, or by drawing the solution into the capsule with a vacuum. The coating is then air dried at room temperature and is fired at 450° C. for 30 minutes in air. Alternatively, vapor deposition techniques, such as chemical vapor deposition, can be employed to produce the metal oxide coating. The lamp capsule is then pressed and processed in the normal manner.

Figure 5:
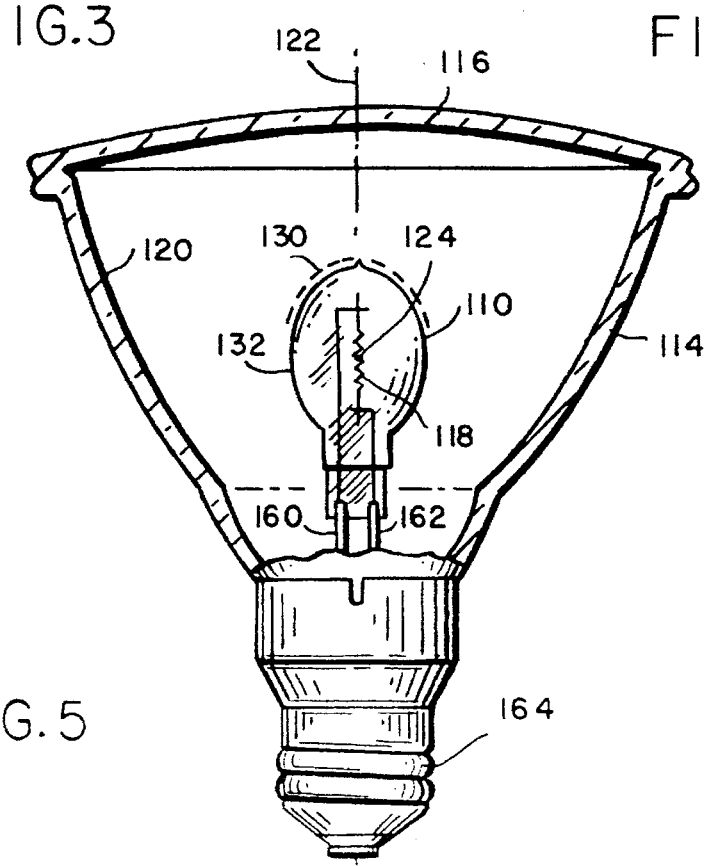
FIG. 5 is a schematic cross-sectional view of a PAR reflector lamp assembly in accordance with the present invention.

The invention has been shown and described thus far in connection with vehicle headlight systems. However, a reflective coating for blocking emission of light in specified directions and for reflecting light back to a filament can be used in any lamp capsule that is mounted in a reflector. A schematic illustration of a parabolic aluminized reflector (PAR) lamp for general illumination is shown in FIG. 5. A lamp capsule 110 is mounted in a reflector 114 having a cavity with a shaped, light-directing surface 120, which is typically a parabolic or ellipsoidal reflecting surface. The surface 120 has a central axis 122. The cavity of reflector 114 may be covered by a lens 116. In other configurations, a lens may not be used and the output end of the reflector is open. A filament 118 is mounted within envelope 132 of lamp capsule 110. The lamp capsule 110 is mounted in reflector 114 such that the filament 118 is on or near the axis 122 of parabolic or ellipsoidal reflecting surface 120, and the center of filament 118 is located at or near the focal point 124 of parabolic or ellipsoidal reflecting surface 120. Contact pins 160 and 162 of lamp capsule 110 are connected to a conventional reflector lamp base 164. A reflective coating 130 is formed on envelope 132. Reflective coating 130 blocks direct transmission of light from filament 118 through lens 116 and reflects light back to filament 118. As described above in connection with FIGS. 1–3, the lamp envelope 132 preferably has an ellipsoidal shape, at least in the portion covered by reflective coating 130. In the embodiment of FIG. 5, the shaped, light-directing surface 120 and the reflective coating 130 have circular symmetry about axis 122. As noted above, the reflective coating can be applied to any lamp capsule which is mounted in a reflector.

Yet another embodiment of the present invention is shown in FIG. 6. A double-ended tungsten halogen incandescent lamp capsule 200 includes a filament 202 mounted on the central axis of a light-transmissive lamp envelope 204. A bulbous portion 204a of lamp envelope 204 surrounding filament 202 has an ellipsoidal shape, and filament 202 is mounted on the central axis of envelope 204. Lead-in wires 206 and 208 are connected to filament 202 and extend through press seals 210 and 212 to contact wires 214 and 216, respectively, at opposite ends of the lamp capsule. The lamp envelope 204 has an interference filter 220 on its outside surface for transmitting visible radiation and for reflecting infrared radiation back to filament 202. The interference filter 220 can be fabricated as described, for example, in U.S. Pat. No. 4,942,331. The interference filter 220 increases the efficacy of the filament 202 as known in the art. The lamp envelope 204 also includes a reflective coating 222 over a portion of the ellipsoidal surface for controlling the light output pattern and for increasing the efficiency of the lamp capsule when it is mounted in a reflector as described above. The reflective coating 222 is preferably formed over the interference filter 220 on the outside surface of envelope 204, but can also be formed under the interference filter 220. The ellipsoidal shape of lamp envelope 204 in the region surrounding filament 202 ensures that infrared radiation reflected by interference filter 220 and both visible and infrared radiation reflected by coating 222 return to filament 202. The lamp capsule 200 can be mounted in a vehicle headlight as shown in FIGS. 1 and 2 or in a reflector for general illumination as shown in FIG. 5.

EXAMPLE 1

An ellipsoidally-shaped lamp capsule was mounted and focused in a standard automotive interchangeable base. The lamp capsule was photometered in an integrating sphere and was found to produce 1902 lumens at 12.8 volts and to consume 66.08 watts. When the lamp capsule was placed in an aerodynamic low beam automotive reflector system, which included the use of a metal light shield, the capsule was measured to project 383 total lumens out of the headlight when operated at the same coil temperature and therefore the same coil lumen output as in the sphere. This converts to 5.79 headlight lumens per watt.

The capsule was coated on a portion of the top end of its outer surface with a thin layer of gold using a vacuum evaporation technique. Gold was applied in a pattern which was empirically determined to prevent any ray from leaving the lamp capsule which was not directed at the parabolic portion of the reflector. The capsule was then photometered at the same coil temperature, and therefore the same coil lumen output, at which it was operated before it was coated with gold, which in this case occurred at 12.48 volts. The capsule was measured to produce 1590.1 lumens in the integrating sphere, while consuming 62.75 watts. This lamp capsule was then placed back in the original low beam automotive reflector system and was measured to project 464 total lumens out of the headlight when operated at the same coil temperature as in the sphere. This converts to 7.40 headlight lumens per watt. The result is a 27.8% increase in the efficiency of this low beam headlight system.

EXAMPLE 2

A solution was made using 50 milliliters (ml) of tetraethylorthosilicate mixed with 183 ml of ethanol, 16 ml of distilled water and 3 ml of nitric acid. This solution was coated on the internal surface of pieces of aluminosilicate hardglass which were shaped into an ellipsoid. The ellipsoid had an exhaust tube on one end and was intersected at the opposite end by the parent tubing from which the ellipsoid was blown. The internal surface was coated with a barrier layer by drawing the solution up through the exhaust tube into the ellipsoidal portion of the bulb using a vacuum. The solution was then slowly expelled back out of the bulb through the exhaust tube. The coating was air dried by blowing a light stream of air through the bulb, and the coating was fired at 450° C. for 30 minutes in air. The bulbs were then made into lamps in normal fashion, using a 65 watt, 12.8 volt automotive filament. The finished lamps had an internal volume of about 1.6 cubic centimeters.

The barrier coated lamps, along with control lamps of the same shape which were not barrier coated, had a thin layer of gold applied to the top dome of the lamp using a vacuum evaporation technique. The gold was applied in a pattern which was empirically determined to prevent any ray from leaving the capsule which was not directed at the parabolic portion of the reflector. These capsules were mounted and focused on standard automotive interchangeable bases.

All of the capsules were placed into the low beam portion of a typical aerodynamic headlight reflector system and were burned at a life test voltage 14.0 volts. Within 50 hours of life test, the walls of all of the capsules that were not coated on the internal surface with the barrier coating had at least partially turned black due to a breakdown in the tungsten halogen cycle, while the walls of all the barrier coated lamps remained free from tungsten deposits throughout the life of the capsules.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An incandescent lamp assembly comprising:
    a reflector defining a cavity, said cavity including a shaped, light-directing surface;
    a lens which closes the cavity of said reflector; and
    an incandescent lamp capsule mounted with in said reflector, said incandescent lamp capsule comprising:
       a hermetically sealed, light-transmissive envelope;
       a fill material including an inert fill gas contained within said envelope;
       at least one filament sealed in said envelope and supported by lead-in-wires; and
       a specularly reflective coating on a portion of said envelope for reflecting radiation emitted by said filament and not directed to the shaped, light-directing surface of said reflector, said envelope, at least in the portion having said reflective coating, having an ellipsoidal shape with a central axis and wherein said filament is located on or near the axis of said ellipsodially-shaped envelope, such that said reflective coating reflects radiation emitted by said filament back to said filament.

2. A lamp assembly as defined in claim 1 wherein said shaped, light-directing surface comprises a parabolic reflecting surface.

3. A lamp assembly as defined in claim 1 wherein said shaped, light-directing surface comprises an ellipsodial reflecting surface.

4. A lamp assembly as defined in claim 1 wherein said incandescent lamp capsule is mounted within said reflector such that said filament is located at or near the focal point of said shaped, light-directing surface.

5. A lamp assembly as defined in claim 4 wherein said reflective coating is selected from the group consisting of aluminum, silver, copper, chromium, nickel, gold, rhodium, palladium, platinum, and combinations thereof.

6. A lamp assembly as defined in claim 4 wherein said reflective coating is formed on an outside surface of said ellipsoidally-shaped envelope.

7. A lamp assembly as defined in claim 6 further including a protective film over said reflective coating.

8. A lamp assembly as defined in claim 6 wherein said reflector is sealed and is filled with an inert gas to prevent oxidation of said reflective coating.

9. A lamp assembly as defined in claim 1 wherein said reflective coating is patterned to block direct transmission of light from said filament to said lens and to portions of said reflector other than said shaped, light-directing surface.

10. A lamp assembly as defined in claim 6 further including a metal oxide coating on an inside surface of said envelope.

11. A lamp assembly as defined in claim 10 wherein said metal oxide coating comprises silicon dioxide.

12. A lamp assembly as defined in claim 1 wherein said fill material further includes a halogen additive.

13. A lamp assembly as defined in claim 1 wherein said reflector includes a heel portion in which said incandescent lamp capsule is mounted and wherein said reflective coating is patterned to block direct transmission of light from said filament to the heel portion of said reflector.

14. A vehicle headlight comprising:

a reflector defining a cavity, said cavity including a shaped, light-directing surface having a focal point;

a lens which closes the cavity of said reflector; and an incandescent lamp capsule mounted within said reflector, said incandescent lamp capsule comprising:
 a hermetically sealed, ellipsoidally-shaped, light-transmissive envelope having a central axis;
 a fill material including an inert fill gas and a halogen additive contained within said envelope;
 a filament sealed in said envelope and supported by lead-in wires, said filament being located at or near the focal point of said reflector and being disposed along or near the central axis of said envelope; and
 a specularly reflective coating on a portion of said envelope, said reflective coating being configured to block direct transmission of radiation from said filament to said lens and to portions of said reflector other than said shaped, light-directing surface, and to reflect radiation emitted by said filament back to said filament.

15. A vehicle headlight as defined in claim 14 wherein reflective coating is selected to reflect visible light and infrared radiation.

16. A vehicle headlight as defined in claim 14 wherein said reflective coating is selected from the group consisting of aluminum, silver, copper, chromium, nickel, gold, rhodium, palladium, platinum, and combinations thereof.

17. A vehicle headlight as defined in claim 14 wherein said reflective coating is formed on an outside surface of said envelope.

18. A vehicle headlight as defined in claim 17 further including a protective film over said reflective coating.

19. A vehicle headlight as defined in claim 17 wherein said reflector is sealed and is filled with an inert gas to prevent oxidation of said reflective coating.

20. A vehicle headlight as defined in claim 16 further including a metal oxide coating on an inside surface of said envelope.

21. A vehicle headlight as defined in claim 20 wherein said metal oxide coating comprises silicon dioxide.

22. A vehicle headlight as defined in claim 14 wherein said reflective coating is formed on an area of said envelope between said filament and said lens.

23. A vehicle headlight as defined in claim 14 wherein said reflective coating is formed on an area of said envelope between said filament and portions of said reflector other than said shaped, light-directing surface.

24. A vehicle headlight as defined in claim 14 wherein said shaped, light-directing surface comprises a parabolic reflecting surface.

25. A vehicle headlight as defined in claim 14 wherein said shaped, light-directing surface comprises an ellipsoidal reflecting surface.

26. A vehicle headlight as defined in claim 14 wherein said lead-in wires extend from one end of said envelope.

27. A vehicle headlight as defined in claim 14 wherein said lead-in wires extend from opposite ends of said envelope.

28. A vehicle headlight as defined in claim 14 wherein said incandescent lamp capsule further includes an interference filter on an outside surface of said envelope for transmitting visible radiation and for reflecting infrared radiation.

* * * * *